Patented Oct. 10, 1922.

1,431,900

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

BASE FOR ANTISTATIC FILMS AND COMPOSITIONS FOR MAKING THE SAME.

No Drawing.  Application filed April 16, 1921. Serial No. 461,915.

*To all whom it may concern:*

Be it known that, I, PAUL C. SEEL, a citizen of the United States of America, residing at Rochester, in the county of Monroe and State of New York, have invented certain new and useful Improvements in Bases for Antistatic Films and Compositions for Making the Same, of which the following is a full, clear, and exact specification.

This invention relates to a base for antistatic photographic film and to a composition for making the same. The principal object of this invention is to provide an inexpensive support or base which may be used in making anti-static photographic film. Still another object of the invention is to provide a composition adapted for the making of such base. Other objects will hereinafter appear.

In the handling of sensitive photographic film, particularly that of the standard type which includes a nitrocellulose support or base, characteristic lines or patches sometimes appear on development, due to electrical discharges which are induced during such handling so as to fog the film. The prevention of this defect becomes commercially very important in the motion picture field, particularly when making negative film strips. In this art the trouble is referred to as "static." Under certain conditions the movement of the film through the motion picture camera may cause it to be very injuriously affected unless certain precautions are taken. While the defect appears more strongly with some types of cameras than others and while it may be to a certain extent avoided by alterations in the camera or cumbersome attachments thereto, nevertheless, it is highly desirable to prevent the static by a proper constitution of the film, so that the latter may be employed in any commercial camera without any precautions being taken by the user.

I have discovered that film having unexpectedly strong anti-static properties may be prepared by adding certain substances to the nitrocellulose film base or support. My invention is an improvement upon the means disclosed in U. S. Patent No. 584,862, Eastman, June 22, 1897, British Patent No. 7501, Boult, of 1892 and German Patent No. 69,231, Eastman Photographic Materials Company, Ltd., of May 16, 1893.

These patents indicate a useful way of combatting static by adding one or more of certain preferred metallic salts to the nitrocellulose film base, including the following: sodium, potassium, cobalt, barium, and ammonium nitrates, sodium potassium, lead, and magnesium acetates, ammonium citrate and manganese sulfate. The German patent attributes the action of these salts to their conductivity of electrical current. It will be noted that certain of these salts have a strong affinity for water, so that they absorb it and retain it in the composition into which they are incorporated. I have found that their usefulness is very greatly increased if certain organic ingredients be added to the nitrocellulose base, together with small amounts of water. These organic substances are, when incorporated in the film, inert toward the photographically sensitive coatings and are also inert as far as any impairment of the strength and transparency of the film base is concerned. They are furthermore of low volatility and consequently remain in the film base. But most important of all they have a strong power of retaining water, which is incorporated in the film base with them; and retaining it moreover without its impairing the transparency of the base. They, therefore, may be called hygroscopic. While my invention is not confined to the use of glycerin but includes analogous and homologous substances, nevertheless, because of its cheapness, I prefer this ingredient.

In carrying out one illustration of my invention, I may incorporate in the nitrocellulose solution or dope from which the film base is made a mixture of a suitable metallic salt, glycerin and water, the preferred salt being sodium hypo phosphite. This salt is preferably present in the proportion of $\frac{1}{2}$ to 1% of the weight of the cellulose nitrate in the solution. The glycerin is present in the proportion of $2\frac{1}{2}$ to 5% of the nitrate and the water is added in the proportion of $2\frac{1}{2}$ to 5% of the nitrate. The salt, glycerin, and water are all thoroughly mixed together before being added to the nitrocellulose solution or dope.

For instance, I may add the above mentioned mixture of a salt, glycerin, and water to dope comprising 100 parts of nitrocellulose, 200 to 400 (say 250) parts of acetone, 200 to 400 (say 250) parts of methyl alcohol, and 20 to 200 (say 40) parts of fusel oil. If desired, additional ingredients, such as camphor may be added from 1 to 30 (say 10) parts. The ingredients are of the commercial kind which have been purified to the point that is usually employed in this art, so that transparent films of the necessary minimum color are produced. Acetone or methyl alcohol may be used alone or varying admixtures of these two volatile solvents, or other equivalent volatile solvents of nitrocellulose may be employed. In place of fusel oil other monohydroxy aliphatic alcohols having from 4 to 5 carbon atoms may be employed, such as the normal butyl alcohol and isobutyl alcohol. It will be noted that none of the above ingredients has either a pronounced acid or alkaline reaction and consequently the dope is substantially neutral.

Other salts which may be substituted for sodium hypo-sulfite include, but are not necessarily limited to, the following: aluminum chloride, stannous chloride, calcium chloride, magnesium chloride, sodium chloride, ammonium nitrate, potassium thio cyanate, calcium bromide, zinc chloride, lead nitrate, aluminum nitrate, zinc bromide, barium bromide, zinc nitrate, zinc salicylate, sodium hyposulfite, magnesium acetate, ammonium citrate, magnesium sulfate, bismuth subcarbonate, sodium formate.

It may be noted that these salts, like the sodium hypophosphite, have a considerable affinity for small amounts of water and, therefore, are in a sense hygroscopic. Moreover, they are inert when incorporated in the film base with respect to the usual photographic sensitive coatings that may be associated therewith.

The dope containing my improved ingredients, when thoroughly mixed and filtered if desired, is flowed or deposited into thin sheets from which the volatile solvents escape, leaving a tough, flexible, transparent film base or support. On this support the usual sensitive photographic coatings are applied in a well known manner. The resulting photographic film, when prepared for motion picture work, has all the usual qualities and in addition prevents or very greatly minimizes any tendency toward static markings without special precautions. The film base alone constitutes a subcombination which may be sold to manufacturers who may coat it with sensitive photographic emulsions.

It is evident from the chemical properties of the ingredients of the hereinabove described dopes that they do not substantially attack or react upon the nitrocellulose, so that there is no considerable denitration or breaking down of the latter,—in other words, the nitrocellulose remains molecularly intact.

This case is a division of my co-pending application Serial No. 434,353, filed Dec. 31, 1920.

Having thus described my invention, what I claim as new and desire to secure by Letters Patent is:

1. As an article of manufacture, a flowed flexible transparent support adapted for the production of anti-static film when coated with a photographic emulsion, which comprises molecularly intact nitrocellulose, an inert metallic salt, an inert hygroscopic organic compound of low volatility and water.

2. As an article of manufacture, a flowed flexible transparent support adapted for the production of anti-static film when coated with a photographic emulsion, which comprises molecularly intact nitrocellulose, an inert metallic salt, glycerin and water.

3. As an article of manufacture, a flowed flexible transparent support adapted for the production of anti-static film when coated with a photographic emulsion, which comprises molecularly intact nitrocellulose, an inert hygroscopic metallic salt, an inert hygroscopic organic compound of low volatility and water.

4. As an article of manufacture, a flowed flexible transparent support adapted for the production of anti-static film when coated with a photographic emulsion, which comprises molecularly intact nitrocellulose, an inert hygroscopic metallic salt, glycerin and water.

5. As an article of manufacture, a flexible transparent support adapted for the production of anti-static film when coated with a photographic emulsion, which comprises nitrocellulose, sodium hypo phosphite, an inert hygroscopic organic compound of low volatility and water.

6. As an article of manufacture, a flexible transparent support adapted for the production of anti-static film when coated with a photographic emulsion, which comprises nitrocellulose, sodium hypo phosphite, glycerin and water.

7. As an article of manufacture, a flexible transparent support adapted for the production of anti-static film when coated with a photographic emulsion, which comprises nitrocellulose, an inert metallic salt in an amount not exceeding 1% of the weight of the nitrocellulose, an inert hygroscopic organic compound of low volatility in an amount not exceeding 5% of the weight of the nitrocellulose, and an amount of water not exceeding 5% of the weight of the nitrocellulose.

8. As an article of manufacture, a flexible transparent support adapted for the production of anti-static film when coated with a photographic emulsion, which comprises nitrocellulose, an inert metallic salt in an amount not exceeding 1% of the weight of the nitrocellulose, glycerin in an amount not exceeding 5% of the weight of the nitrocellulose and water in an amount not exceeding 5% of the weight of the nitrocellulose.

9. As an article of manufacture, a flexible transparent support adapted for the production of anti-static film when coated with a photographic emulsion, which comprises nitrocellulose, an inert hygroscopic metallic salt in an amount not exceeding 1% of the weight of the nitrocellulose, an inert hygroscopic organic compound of low volatility in an amount not exceeding 5% of the weight of the nitrocellulose, and water in an amount not exceeding 5% of the weight of the nitrocellulose.

10. As an article of manufacture, a flexible transparent support adapted for the production of anti-static film when coated with a photographic emulsion, which comprises nitrocellulose, an amount of sodium hypo phosphite not exceeding 1% of the weight of the nitrocellulose, an amount of water not exceeding 5% of the weight of the nitrocellulose, and an amount of gylcerin not exceeding 5% of the weight of the nitrocellulose.

11. A flowable film-forming substantially neutral composition of matter, comprising nitrocellulose, an inert metallic salt, and inert hygroscopic organic compound of low volatility and water, together with a volatile common solvent.

12. A flowable film-forming substantially neutral composition of matter, comprising nitrocellulose, an inert metallic salt, glycerin and water, together with a volatile common solvent.

13. A flowable film-forming substantially neutral composition of matter, comprising nitrocellulose, an inert hygroscopic metallic salt, glycerin and water, together with a volatile common solvent.

14. A flowable film-forming composition of matter, comprising nitrocellulose, sodium hypo phosphite, glycerin and water, together with a volatile common solvent.

15. A flowable film-forming composition of matter, comprising nitrocellulose, an inert metallic salt in an amount not exceeding 1% of the weight of the nitrocellulose, an inert hygroscopic organic compound of low volatility in an amount not exceeding 5% of the weight of the nitrocellulose, and an amount of water not exceeding 5% of the weight of the nitrocellulose, together with a volatile common solvent.

16. A flowable film-forming composition of matter, comprising nitrocellulose, an inert metallic salt in an amount not exceeding 1% of the weight of the nitrocellulose, glycerin in an amount not exceeding 5% of the weight of the nitrocellulose and water in an amount not exceeding 5% of the weight of the nitrocellulose, together with a volatile common solvent.

17. A flowable film-forming composition of matter, comprising nitrocellulose, an amount of sodium hypo phosphite not exceeding 1% of the weight of the nitrocellulose, an amount of glycerin not exceeding 5% of the weight of the nitrocellulose, and an amount of water not exceeding 5% of the weight of the nitrocellulose, together with a volatile common solvent.

18. A substantially neutral composition of matter for addition to nitro-cellulose film-making dopes, comprising an inert metallic salt, an inert hygroscopic organic compound of low volatility and water.

19. A substantially neutral composition of matter for addition to nitrocellulose film-making dopes, comprising a metallic salt, glycerin and water.

20. A substantially neutral composition of matter for addition to nitrocellulose film-making dopes, comprising an inert hygroscopic metallic salt, glycerin and water.

21. A composition of matter for addition to nitrocellulose film-making dopes, comprising sodium hypo phosphite, glycerin and water.

22. A composition of matter for addition to nitrocellulose film-making dopes, comprising ½ to 1 part of an inert metallic salt, 1 to 5 parts of an inert hygroscopic organic compound of low volatility and 1 to 5 parts of water.

23. A composition of matter for addition to nitrocellulose film-making dopes, comprising ½ to 1 part of an inert metallic salt, 1 to 5 parts of glycerin, and 1 to 5 parts of water.

24. A composition of matter for addition to nitrocellulose film-making dopes, comprising ½ to 1 part of sodium hypo phosphite, 1 to 5 parts of glycerin and 1 to 5 parts of water.

25. A flowable film-forming dope comprising nitrocellulose, a monohydroxy aliphatic alcohol having from 4 to 5 carbon atoms, a volatile common solvent and a mixture of an inert metallic salt, an inert hygroscopic organic compound of low volatility and water.

26. A flowable film-forming dope comprising nitrocellulose, a monohydroxy aliphatic alcohol having from 4 to 5 carbon atoms, a volatile common solvent and a mixture of sodium hypo phosphite, glycerin and water.

27. A composition of matter comprising cellulose nitrate 100 parts, acetone 200 to 400 parts, methyl alcohol 200 to 400 parts, fusel oil 20 to 200 parts, sodium hypo phosphite ½ to 1 part, glycerin 1 to 5 parts, and water 1 to 5 parts.

28. The process of modifying a flowable film-forming nitrocellulose dope which comprises pre-mixing sodium hypo phosphite, glycerin and water and then incorporating said mixture in said dope.

Signed at Rochester, New York, this 6th day of April 1921.

PAUL C. SEEL.